Fig. I.

INVENTOR
John M. West
BY Eldon H. Luther
ATTORNEY

Sept. 21, 1965 J. M. WEST 3,207,668
SYSTEM FOR FUEL ELEMENTS FAILURE DETECTION IN NUCLEAR REACTOR
Filed May 2, 1960 3 Sheets-Sheet 2

INVENTOR.
John M. West
BY
Eldon H. Luther
ATTORNEY

INVENTOR
John M. West
BY
Eldon H. Luther
ATTORNEY

3,207,668
SYSTEM FOR FUEL ELEMENTS FAILURE DETECTION IN NUCLEAR REACTOR
John M. West, Dunedin, Fla., assignor, by mesne assignments, to Combustion Engineering, Inc., a corporation of Delaware
Filed May 2, 1960, Ser. No. 55,816
19 Claims. (Cl. 176—19)

This invention relates generally to nuclear reactors having cores that are comprised of numerous fuel elements retained in spaced relation, with the invention having particular relation to a system and process for detecting the region in the core where there exists a fuel element which has a leak in the cladding, with this detection being effected while the reactor is in operation.

In nuclear reactors and in power systems employing these reactors as a heat source, it is a relatively simple task to determine when a fuel element failure occurs in the reactor since the level of radio-activity in the effluent from the reactor will substantially increase as a result of such a failure. However, the reactor cores are comprised of a large number of fuel elements, with the cores generally divided into assemblies and which assemblies are individually removable and insertable in the core, and, as previously mentioned, while the presence of a fuel element failure in the reactor can be detected, it has heretofore been an expensive and time consuming task to locate the failure and to determine the particular assembly within which the failure occurred, necessitating shutting down the reactor and making a thorough search or probe through the entire core.

The present invention is directed to greatly simplifying this task of locating a ruptured fuel element.

In accordance with the invention the power output is sequentially increased in a programmed manner and in particular confined locations which collectively cover the core area. This increase in power output raises the temperature of the fuel elements in the particular location and this increase in temperature, due to gas expansion, will cause radioactive gases to be forced out an opening or rupture in a fuel element thereby giving a sudden increase in the level of radioactivity in the reactor effluent. During this sequential, programmed increase in power the gases that are collected from the reactor are continuously monitored with regard to their level of radioactivity. Thus when the particular confined location where there exists a ruptured fuel element has its power increased the increase in radioactivity of the reactor effluent is detected and since the particular location is known because of the programming, the location of the element is known to be in that particular area.

In one embodiment of the invention the particular confined locations or areas are made to correspond with the area of each fuel element assembly so that the assembly that contains the ruptured element is pinpointed.

The power may be sequentially increased in the confined locations by means of removing poison (high neutron absorption cross section), by varying the fuel, or by increasing the moderator density at the location, or combinations of these ways of increasing power may be employed.

Accordingly, it is the object of this invention to provide an improved system for locating fuel element failures in nuclear reactors. Other and further objects of the invention will become apparent to those skilled in the art as the description proceeds.

With the aforementioned objects in view, the invention comprises an arrangement, construction and combination of the elements of the inventive organization in such a manner as to obtain the results desired as hereinbefore more particularly set forth in the following detailed description of illustrative embodiment, such embodiment being shown by the accompanying drawings wherein.

Figure 1:
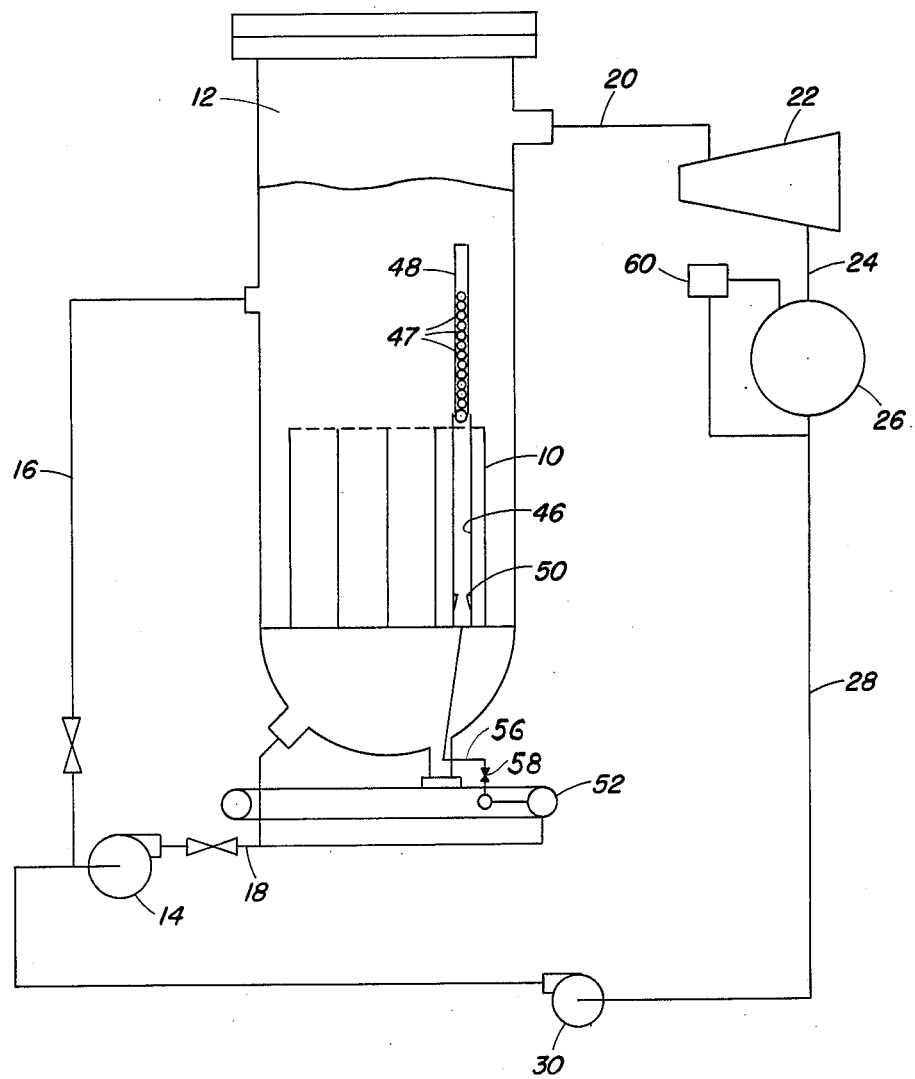
FIGURE 1 is a diagrammatic representation of a system utilizing a nuclear reactor and within which is employed the present invention.

Referring now to the drawings, wherein like reference characters are used throughout to designate like elements, the illustrative embodiment of the invention discloses a boiling water nuclear reactor which includes core 10 mounted and retained within vessel 12. Water is circulated through the reactor by circulating pump 14 which is connected to the upper portion of vessel 12 by conduit 16 and has its outlet connected with the lower region of the vessel by conduit 18. During passage of the water up through the core, a portion of the water is evaporated, with the steam being separated from the water in the upper region of vessel 12 and being conveyed from the vessel by conduit 20 to turbine 22. The low pressure steam from this turbine is conveyed through conduit 24 to condenser 26 where the steam is condensed with the condensant from this condenser being conveyed through conduit 28 to the inlet of pump 14, with condensate pump 30 sufficiently raising the pressure of this condensate for this purpose.

Figure 3:
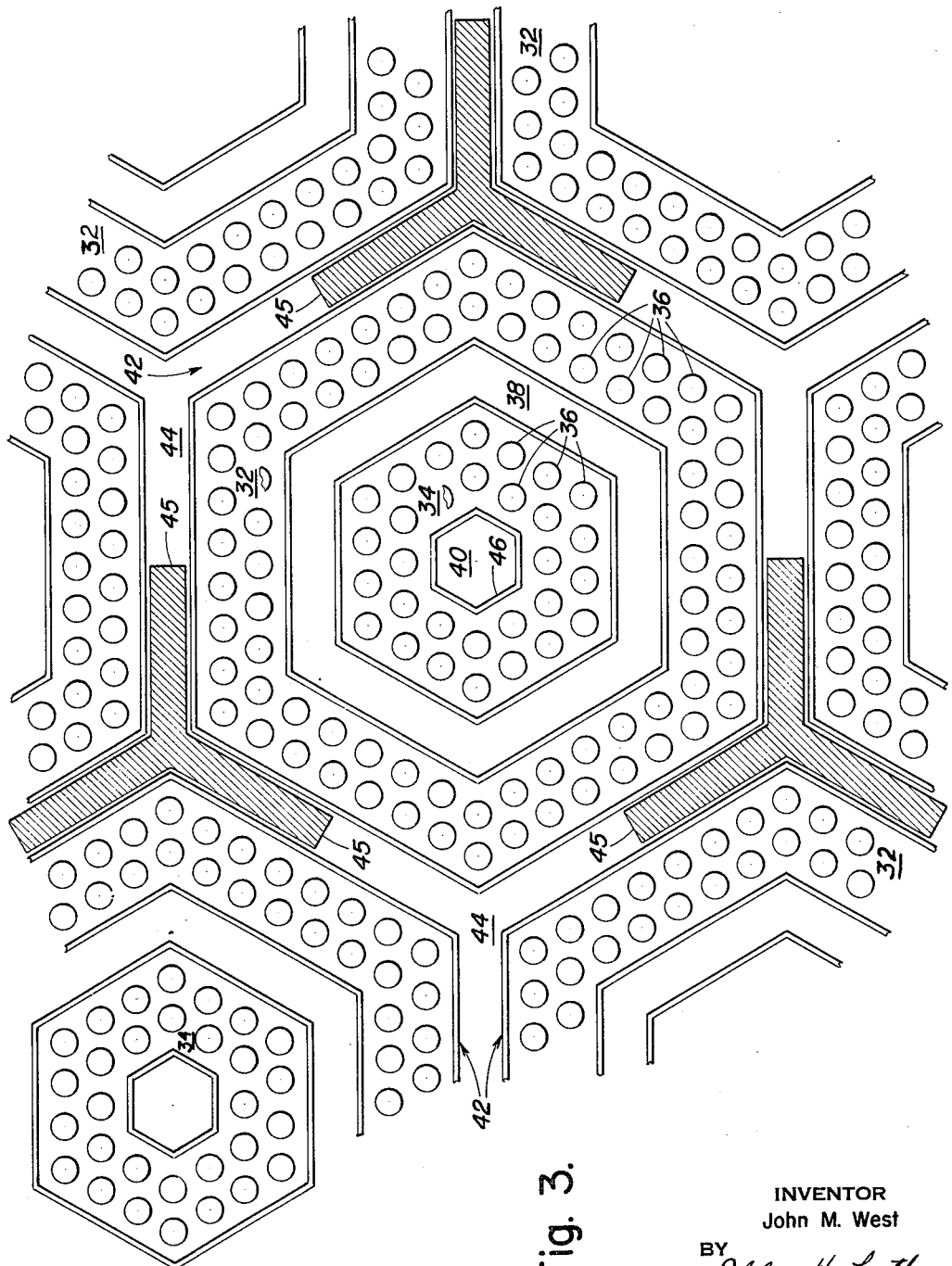
FIGURE 3 is a detailed transverse view of one of the fuel assemblies and a portion of its adjacent assemblies.

In this illustrative organization the reactor core is comprised of a plurality of elongated removable fuel assemblies 42 which are mounted generally vertically between upper and lower grids, with each of the assemblies in the illustrated embodiment being constructed in the general manner of the improved assembly organization described and claimed in co-pending application Serial No. 14,723, now U.S.P. 3,132,076, of John M. West and Robert W. Deutsch, filed March 14, 1960. This assembly, as best shown in FIGURE 3, is comprised of a plurality of radially spaced longitudinally extending fuel element channels 32 and 34. These channels are internested, as shown, and are annular or perimetrically extending. As depicted in FIGURE 3, there is a pair of rows of fuel element rods or tubes 36 in each channel and the channels are spaced from each other by a passage 38. Within the channel 34 is located the passage 40 which may receive a movable poison, movable fuel, or a cold stream of water for the purpose of increasing the power in order to locate a fuel element failure. By providing the passage 40, which receives the power changing medium, in the center of the fuel assembly the arrangement may be such that the location or area over which the power changing medium in any one passage 40 is effective will correspond to that of the particular fuel assembly. This may be done by properly designing the equipment and in this respect it will be understood that arrangements other than the particular, illustrated fuel assembly configuration may be employed. For instance, the assembly may comprise only one channel, i.e., inner channel 34, rather than the two internested channels shown. In this arrangement where the power changing medium is inserted centrally of the core the detection system is effective to pinpoint the assembly in which a fuel element failure exists.

Each of the fuel assembles 42 is spaced from its adjacent assemblies by means of channel 44 and within these channels 44 are received the control rods 45 which are conventionally employed to control the reactor.

Figure 2:
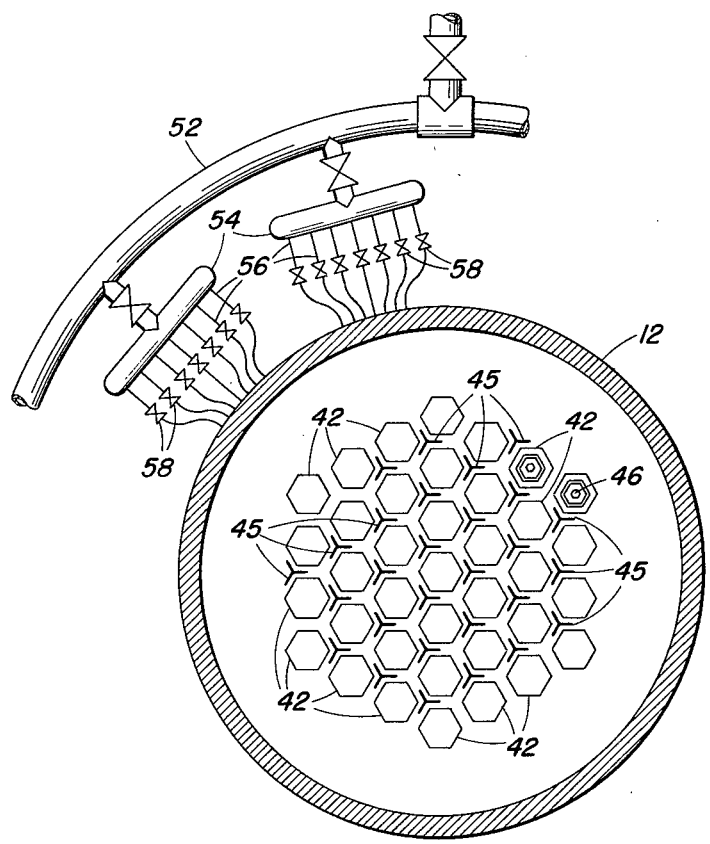
FIGURE 2 is a diagrammatic representation in the nature of a fragmentary transverse section of FIGURE 1.

As previously mentioned the power in the confined locations (each fuel assembly in the illustrative arrangement) may be increased by means of moving a poison, moving fuel, or increasing the density of the moderator or by combinations of these methods, and there is shown in FIGURES 1 and 2 an organization for manipulation of poison or a fuel in the passage 40. This organization provides for a fluid flow operated system for controlling the disposition of a poison or fuel material within each of the channels 40. As embodied, the channel 40 is formed by tubular member 46 and extending up from and connected with the upper end of this tubular member is a storage tube 48 (FIGURE 1) having an opening in its upper end. Contained within these tubes are a plurality of balls 47 that either contain a poison or a fuel and which are adapted to be moved from the tube 46 into storage tube 48 by means of an upwardly directed fluid jet and are moved from the storage tube 48 into the tubular member 46 by means of gravity when there is insufficient upwardly directed force to retain these members in this storage tube. These balls are confined to the tubes 46 and 48 with stop 50 limiting the downward movement of the balls and the upper end of the storage tube limiting the upward movement.

The balls are selectively moved from the tube 46 into the storage tube by means of an upwardly directed fluid jet which is supplied through a fluid distribution system. This system includes a ring header 52 which communicates with the outlet of pump 14 as shown in FIGURE 1 and which supplies the subheaders 54. From each of these latter headers, there extends a supply or jet tube 56 which communicates with the lower end of tubular member 46 and which contains the remotely operated control valve 58. Accordingly, by means of operating the valve 58, the supply of an upwardly directed jet of fluid to tubular member 46 is controlled and therefore the positioning of the balls may be controlled. The organization is such that when the balls in each assembly contain a poison and are moved out of the core into storage tube 48 the power output of each element in the assembly will increase. Similarly when the balls in each assembly contain a fuel the power output of the elements in the assembly will change, the direction of the change depending upon the details of the design. It is noted that to obtain this result the balls need not be moved completely out of or into the core but in the case of fuel balls there needs only to be an increase or decrease of fuel in the core depending upon the particular design and in the case of poison balls there needs only to be a decrease of poison in the core.

The gas that is exhausted from the condenser 26 is monitored by the monitoring means 60 with respect to the level of fission product radioactivity of this gas. This monitor may take the form of a scintillation counter and the monitoring of this gas is a continuous operation.

The presence of a fuel element rupture in the reactor core is determined by an increase in the radioactivity at the monitor 60. When a fuel element failure does occur, the valves 58 are then sequentially actuated. In normal operation if the poison balls 47 are employed, they will be retained in the storage tube 48 with each of the valves 58 being open while if fuel balls are employed, they will be retained in the core with valves 58 being closed. Upon a fuel element failure, each of the valves 58 will be sequentially operated in a programmed manner, with the valves being sequentially closed and opened with poison balls to first deposit balls in and then remove them from the core and sequentially opened and closed with fuel balls to first remove balls from and then deposit balls in the core. This has the effect of first reducing and then increasing the power output of the assemblies sequentially and it is this increase in power output that results in the emission of gases from a ruptured fuel element. The monitor 60 is observed or provides a record during this sequentially, programmed manipulation of valves 58 so that the fuel assembly which provides the greatest increase in radioactivity of the reactor effluent in response to increasing its power and which assembly is the one containing a ruptured fuel element is accurately located.

In lieu of increasing the power in the assembly by means of a movable poison or a movable fuel, the power in each assembly may be independently increased by increasing the density of the moderator in the assembly. For example, in the illustrative boiling water reactor, cold water may be sequentially introduced into the tubular members 46 or more preferably throughout the entire area of the assembly and such water may be supplied and introduced through the fluid distribution system disclosed, i.e., headers 52, 54, conduits 56 and valves 58. Furthermore, cold water may be employed to eject poison balls whereby there will be a power increase both by removing a poison and by increasing the density of the moderator.

While locating the particular fuel assembly within which a ruptured fuel element is disposed is wherein the invention finds its greatest advantage, the invention is also very useful and of substantial advantage in locating the general region in the core where a ruptured fuel element is found even though it does not locate the precise fuel assembly. Such is the case when the region of power increase is not merely primarily a single fuel assembly but is rather greater than a single fuel assembly. In order to pinpoint the particular assembly of a fuel element rupture, it is necessary to have an assembly with a central channel which may be employed for increasing the power output of the assembly. However, the invention is useful in reactors having assemblies other than those with central channels, such as those with assemblies having fuel elements uniformly spaced throughout the area of the assembly. It is only required to sequentially increase the power output in confined or limited areas throughout the core, which areas collectively cover the entire core area. This can be done by any of the aforementioned means of removing poison, inserting or removing fuel, or by changing moderator density. This will enable the ruptured element to be located within a particular confined area and even though this is not a single assembly the task of locating the particular assembly upon shutting down the reactor is greatly decreased.

While I have illustrated and described preferred embodiments of the invention, it is to be understood that such is merely illustrative and not restrictive and that variations and modifications may be made therein without departing from the spirit and scope of the invention. I, therefore, do not wish to be limited to the precise details set forth but desire to avail myself of such changes as fall within the scope of my invention.

What is claimed is:

1. In a nuclear reactor having a core comprised of separate, elongated fuel elements the method of determining, while operating the reactor, the location, within a particular area, of a ruptured fuel element comprising sequentially increasing the power output of a large number of limited areas of the core which areas collectively cover substantially the entire core area, measuring the level of radioactivity of the reactor effluent and determining the relative changes in the level of radioactivity incident to said sequential increase in power output with the area within which the greatest change occurs being the area containing the ruptured fuel element.

2. The method of claim 1 wherein the power output is increased by removal of poison from the limited area.

3. The method of claim 1 wherein the power output is increased by the addition of fuel to the limited area.

4. The method of claim 1 wherein the power output is increased by increasing the density of a moderator in the limited area.

5. In a nuclear reactor having separate fuel assemblies, the system for detecting, while operating the reactor, within which assembly the rupture of a fuel element has occurred comprising sequentially increasing the power output of each assembly, measuring the level of radioactivity of the reactor effluent and determining the change in level of radioactivity of said effluent incident to such power change with the area where the greater change occurs being the area containing the ruptured fuel element.

6. The method of claim 5 wherein the power output is increased by removal of poison from the assembly.

7. The method of claim 5 wherein the power output is increased by addition of fuel to the assembly.

8. The method of claim 5 wherein the power output is increased by increasing the density of a moderator in the assembly.

9. In a nuclear reactor having separate fuel element assemblies capable of receiving control elements centrally thereof the system for detecting, while operating the reactor, within which assembly the rupture of a fuel element has occurred comprising sequentially inserting and withdrawing a poison material generally centrally of each assembly, measuring the level of reactivity of the reactor effluent and determining the relative change in the level of radioactivity of the reactor effluent as the poison is inserted and withdrawn from each assembly with the assembly within which the greatest change occurs being the assembly containing the ruptured fuel element.

10. In a steam operated power plant system employing a boiling water reactor as the source of power and having a prime mover and condenser, respectively, receiving steam from the reactor with the reactor having a core comprised of separate fuel assemblies each having a plurality of fuel elements and each being capable of receiving control means centrally thereof the method of determining, while operating the reactor, and when a fuel element ruptures, within which assembly the rupture has occurred comprising the steps of sequentially inserting and withdrawing a poison material generally of each assembly, monitoring, with respect to the level of radioactivity, the gases contained in the steam egressing from the reactor, and determining which assembly produces the greatest change in radioactivity with this assembly having the ruptured element.

11. In combination, a nuclear reactor, the core of the reactor being comprised of a plurality of separate removable fuel assemblies, each assembly having a plurality of elongated fuel elements and each assembly having a generally centrally disposed passageway extending longitudinally thereof, individual means associated with the passageway of each assembbly and operative to vary the power output of the assembly, means to separately control said individual means for sequential and programmed manipulation thereof, and means operative to measure the level of radioactivity of the gases contained in the effluent from the reactor.

12. In combination, a nuclear reactor, the core of the reactor being comprised of a plurality of separate removable fuel assemblies, each assembly having a plurality of elongated fuel elements and each assembly having a generally centrally disposed passageway extending longitudinally thereof, each of said passageways having a poison material associated therewith and movable into and out of the passageway, means operative to separately and individually move the poison into and out of each passageway and means operative to measure the level of radioactivity of the gases contained in the effluent from the reactor.

13. In a nuclear reactor having a number of spaced fuel elements over which a coolant is conveyed the system for detecting, while operating the reactor, the location, within a particular area, of a ruptured fuel element comprising sequentially increasing the power output of a number of limited areas of the reactor which areas collectively cover substantially the entire reactor area, measuring the radioactivity of at least a portion of the coolant egressing from the reactor and determining the relative changes in the radioactivity incident to said sequential increase in power output with the area within which the greatest change occurs being the area containing the ruptured fuel element.

14. In a steam operated power plant system employing a boiling water reactor as the source of power and having a prime mover and condenser, respectively, receiving the steeam from the reactor with the reactor having a core comprised of a number of spaced fuel elements the method of determining, while operating the reactor, the location, within a particular area, of a ruptured fuel element comprising sequentially increasing the power output of a number of limited areas of the core which areas collectively cover substantially the entire core area, measuring the level of radioactivity of at least a portion of the gaseous effluent egressing from the boiling water reactor and determining which area produces the greatest change in radioactivity with this area having the ruptured element.

15. In a nuclear reactor having a core comprised of separate, elongated fuel elements the method of determining, while operating the reactor, the location, within a particular area, of a ruptured fuel element comprising sequentially changing by decreasing and then increasing the power output of a large number of limited areas of the core which areas collectively cover substantially the entire core area, measuring the level of radioactivity of the reactor effluent and determining the relative changes in the level of radioactivity incident to said sequential increase in power output with the area within which the greatest change occurs being the area containing the ruptured fuel element.

16. The method of claim 15 wherein the sequential changing of the power output is effected by manipulation of a poison in the vicinity of the confined area.

17. The method of claim 15 wherein the sequential changing of the power output is effected by manipulation of fuel in the vicinity of the confined area.

18. The method of claim 15 wherein the sequential changing of the power output is effected by manipulation of the moderator in the confined areas.

19. In a nuclear reactor having a number of spaced fuel elements over which a coolant is conveyed the system for detecting, while operating the reactor, the location, within a particular area, of a ruptured fuel element comprising sequentially changing by decreasing and then increasing the power output of a number of limited areas of the reactor which areas collectively cover substantially the entire reactor area, measuring the reactivity of at least a portion of the coolant egressing from the reactor and determining the relative changes in the radioactivity incident to said sequential increase in power output with the area within which the greatest change occurs being the area containing the ruptured fuel element.

References Cited by the Examiner

UNITED STATES PATENTS 2,708,656   5/55   Fermi et al. _____ 176—41

OTHER REFERENCES

Bettis: Technical Review, vol. I, #3, August 1957, pp. 98–109.

Nuclear Power 5 (No. 48, April 1960), p. 126.

CARL D. QUARFORTH, *Primary Examiner.*

REUBEN EPSTEIN, ROGER L. CAMPBELL,
*Examiners.*

UNITED STATES PATENT OFFICE
CERTIFICATE OF CORRECTION

Patent No. 3,207,668                        September 21, 1965

John M. West

It is hereby certified that error appears in the above numbered patent requiring correction and that the said Letters Patent should read as corrected below.

Column 5, line 35, for "generally of" read -- generally centrally of --.

Signed and sealed this 14th day of June 1966.

(SEAL)
Attest:

ERNEST W. SWIDER                                EDWARD J. BRENNER
Attesting Officer                                      Commissioner of Patents

UNITED STATES PATENT OFFICE
CERTIFICATE OF CORRECTION

Patent No. 3,207,668 September 21, 1965

John M. West

It is hereby certified that error appears in the above numbered patent requiring correction and that the said Letters Patent should read as corrected below.

Column 5, line 35, for "generally of" read -- generally centrally of --.

Signed and sealed this 14th day of June 1966.

(SEAL)
Attest:

ERNEST W. SWIDER
Attesting Officer

EDWARD J. BRENNER
Commissioner of Patents